United States Patent [19]

Bland et al.

[11] Patent Number: 4,938,726
[45] Date of Patent: Jul. 3, 1990

[54] MARINE PROPULSION DEVICE BELLOWS ASSEMBLY

[75] Inventors: Gerald F. Bland, Glenview; Donald K. Sullivan, Arlington Heights, both of Ill.

[73] Assignee: Outboard Marine Corporation, Waukega, Ill.

[21] Appl. No.: 722,004

[22] Filed: Apr. 11, 1985

[51] Int. Cl.$^5$ .............................................. B63H 23/36
[52] U.S. Cl. ............................... 440/112; 277/212 FB
[58] Field of Search .......................... 440/112, 88, 89; 277/30, 212 FB, 207 A; 285/226, 299

[56] References Cited

U.S. PATENT DOCUMENTS

| 3,888,203 | 6/1975 | Lohse | 440/89 |
| 3,913,517 | 10/1975 | Lohse | 440/61 |
| 3,952,687 | 4/1976 | Brownlie et al. | 440/112 |
| 4,178,873 | 12/1979 | Bankstahl | 440/89 |
| 4,201,391 | 5/1980 | Bankstahl | 440/53 |
| 4,289,488 | 9/1981 | Weronke et al. | 440/57 |

FOREIGN PATENT DOCUMENTS 923367  11/1960  United Kingdom .

Primary Examiner—Joseph F. Peters, Jr.
Assistant Examiner—Jesús D. Sotelo
Attorney, Agent, or Firm—Michael, Best & Friedrich

[57] ABSTRACT

A marine propulsion device comprising a pivot housing including an opening, and a lip extending inwardly around the opening, a flexible bellows having an end complementary with and communicating with the opening in the pivot housing, the end of the bellows including a flange engaged with the lip, a propulsion unit removably connected to the pivot housing and including a portion engageable with the end of the bellows for compressing and securing the flange against the lip on the pivot housing so that the flange sealingly engages the pivot housing when the propulsion unit is connected to the pivot housing.

31 Claims, 1 Drawing Sheet

MARINE PROPULSION DEVICE BELLOWS ASSEMBLY

BACKGROUND OF THE INVENTION

The invention relates to bellows assemblies for marine propulsion devices, and, more particularly, to means for attaching a bellows to the pivot housing of a marine propulsion device.

In a typical stern drive or inboard/outboard marine propulsion device, the horizontal driveshaft assembly is normally sealed from water. In particular, the horizontal driveshaft assembly is surrounded by a flexible bellows extending between the gimbal housing and the pivot housing.

One prior means of attaching a bellows to the gimbal housing and to the pivot housing is with band clamps.

Another prior means for attaching a bellows to the pivot housing is disclosed in Bankstahl U.S. Pat. No. 4,201,391, issued May 6, 1980.

Attention is also directed to the following U.S. patents which disclose marine propulsion device bellows assemblies:

Lohse U.S. Pat. No. 3,888,203, issued June 10, 1975;
Lohse, et al U.S. Pat. No. 3,913,517, issued Oct. 21, 1975;
Bankstahl U.S. Pat. No. 4,178,873, issued Dec. 18, 1979;
Brownlie, et al U.S. Pat. No. 3,952,687, issued Apr. 27, 1976; and
Weronke, et al U.S. Pat. No. 4,289,488, issued Sept. 15, 1981.

SUMMARY OF THE INVENTION

The invention provides a marine propulsion device comprising a pivot housing adapted to be mounted on the transom of a boat for pivotal movement relative to the transom about a generally vertical steering axis, and about a generally horizontal tilt axis, the pivot housing including an opening, and a lip extending inwardly around the opening, a propulsion unit removably connected to the pivot housing for pivotal movement with said pivot housing, a flexible bellows having an end including an outwardly extending flange engaged with the lip, and interengaging means on the pivot housing and on the bellows for releasably securing the end of the bellows in communication with the opening, the interengaging means including the lip and the flange.

In one embodiment, the lip extends rearwardly and radially inwardly around the opening, and the flange extends forwardly and radially outwardly around the end of the bellows.

In one embodiment, the propulsion unit includes means engageable with the end of the bellows for compressing and securing the bellows against the lip so that the bellows sealingly engages the pivot housing when the propulsion unit is connected to the pivot housing.

In one embodiment, the end of the bellows forms a rearwardly facing groove, and the means engageable with the end of the bellows includes a portion of the propulsion unit having a forward edge receivable in the groove in response to connection of the propulsion unit to the pivot housing.

In one embodiment, the portion of the propulsion unit is a bearing carrier.

The invention also provides a marine propulsion device comprising a flexible bellows having a rearward end with a flange extending radially outwardly therefrom, a pivot housing including an opening complementary with and communicating with the rearward end of the bellows, and a propulsion unit removably connected to pivot housing, the pivot housing and the propulsion unit including inwardly converging cooperating surfaces forming a channel extending around the opening and being adapted to interlock with the flange.

In one embodiment, the flange is adapted to be compressed between the cooperating surfaces so that the flange sealingly engages the pivot housing.

In one embodiment, the channel is adapted to interlock with the flange so as to substantially prevent both longitudinal and radial movement of the rearward end of the bellows.

In one embodiment, the pivot housing includes a lip extending inwardly around the opening and forming one of the cooperating surfaces, and the propulsion unit includes a portion adjacent to the lip and forming the other of the cooperating surfaces.

In one embodiment, the portion of the propulsion unit is a bearing carrier having a forward edge forming the other of the cooperating surfaces.

The invention also provides a marine propulsion device comprising a flexible bellows having a rearward end with a flange extending radially outwardly therefrom, a pivot housing including an opening complementary with and communicating with the rearward end of the bellows, a propulsion unit removably connected to the pivot housing, and interengaging means on the bellows, on the pivot housing, and on the propulsion unit, the interengaging means including cooperating surfaces on the bellows and the pivot housing, cooperating surfaces on the bellows and the propulsion unit, and cooperating surfaces on the pivot housing and the propulsion unit.

In one embodiment, the cooperating surfaces on the pivot housing and the propulsion unit form a channel extending around the opening in the pivot housing and interlocking with the flange.

In one embodiment, the cooperating surfaces on the bellows and the propulsion unit are formed by interengaging means on the propulsion unit and on the end of the bellows.

In one embodiment, the cooperating surfaces on the bellows and the pivot housing are formed by interengaging means on the pivot housing and on the end of the bellows.

The invention also provides a marine propulsion device comprising a pivot housing adapted to be mounted on the transom of a boat for pivotal movement relative to the transom about a generally vertical steering axis, and about a generally horizontal tilt axis, the pivot housing including an opening, a propulsion unit removably connected to the pivot housing, a flexible bellows having an end complementary with the opening in the pivot housing, and means for securing the end of the bellows in communication with the opening such that the bellows sealingly engages the pivot housing when the propulsion unit is connected to the pivot housing, and such that the bellows is releasable from communication with the opening in the pivot housing when the propulsion unit is disconnected from the pivot housing.

In one embodiment, the pivot housing has a rearward end, the propulsion unit is removably connected to the rearward end of the pivot housing, and the means for securing the bellows is accessible from the rearward end of the pivot housing.

The invention also provides a marine propulsion device comprising a pivot housing adapted to be mounted on the transom of a boat for pivotal movement relative to the transom about a generally vertical steering axis, and about a generally horizontal tilt axis, the pivot housing including an opening, a propulsion unit removably connected to the pivot housing for pivotal movement therewith, a flexible bellows having a rearward end complementary with and communicating with the opening in the pivot housing, and interengaging means on the propulsion unit and on the end of the bellows for releasably securing the end of the bellows in communication with the opening in the pivot housing, the interengaging means including, on the end of the bellows, a rearwardly facing groove, and, on the propulsion unit, a portion having a forward edge receivable in the groove.

A principal feature of the invention is the provision of a marine propulsion device comprising a pivot housing including interengaging means on the bellows, on the pivot housing, and on the propulsion unit for releasably securing the end of the bellows in communication with the opening, the interengaging means including cooperating surfaces on the bellows and the pivot housing, cooperating surfaces on the bellows and the propulsion unit, and cooperating surfaces on the pivot housing and the propulsion unit.

Another principal feature of the invention is the provision of a marine propulsion device wherein the pivot housing and the propulsion unit include cooperating surfaces forming a channel extending around the opening of the pivot housing and interlocking with the flange on the end of the bellows.

Another principal feature of the invention is the provision of means for securing the end of the bellows in communication with the opening in the pivot housing such that the bellows sealingly engages the pivot housing when the propulsion unit is connected to the pivot housing, and such that the bellows is released from communication with the opening when the propulsion unit is disconnected from the pivot housing.

Other features and advantages of the invention will become apparent to those skilled in the art upon review of the following detailed description, claims and drawings.

Figure 1:
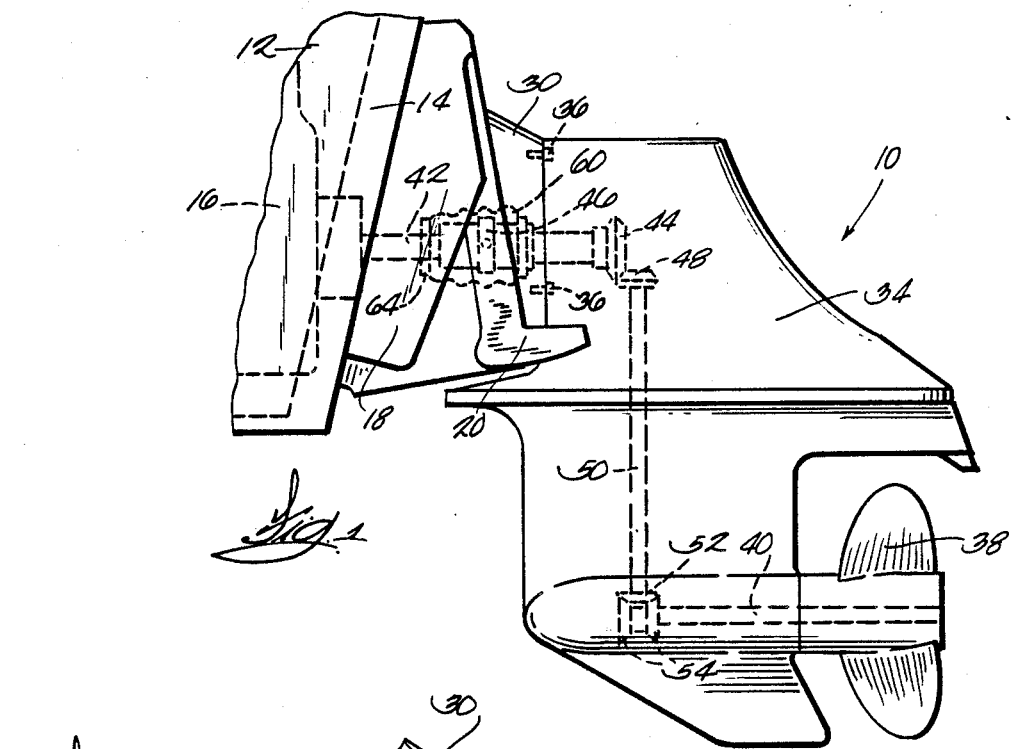
FIG. 1 is a side elevational view of a marine propulsion device embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in the drawings is a marine propulsion device 10 mounted on a boat 12 having a transom 14. The marine propulsion device 10 is of the stern drive or inboard/outboard type.

As best shown in FIG. 1, the marine propulsion device 10 comprises an engine 16 securely mounted on the boat frame by suitable means such as rubber mounts (not shown). The marine propulsion device 10 also comprises a gimbal housing 18 mounted on the outer surface of the boat transom 14 and fixedly attached to the boat transom 14. The gimbal housing 18 can be attached to the boat transom 14 by any suitable means, such as bolts extending through the transom 14.

The marine propulsion device 10 also comprises a gimbal ring 20 connected to the gimbal housing 18 for pivotal movement relative to the gimbal housing 18 about a generally vertical steering axis (not shown), and a pivot housing 30 connected to the gimbal ring 20 for pivotal movement relative to the gimbal ring 20 about a generally horizontal tilt axis (not shown). Such a construction is well known in the art and need not be described in greater detail.

The marine propulsion device 10 also comprises a propulsion unit 34 removably connected to the pivot housing 30 for common pivotal movement of the propulsion unit 34 with the pivot housing 30. In the illustrated construction. the propulsion unit 34 is removably connected to the pivot housing 30 by a plurality of bolts 36. The propulsion unit 34 includes a propeller 38 mounted on a propeller shaft 40, and a generally horizontal drive shaft 42 having one end removably connected to the engine 16 and an opposite end having thereon a bevel gear 44. A universal joint 46 attached to the horizontal drive shaft 42 allows pivotal movement of the drive shaft 42 with the propulsion unit 34. The bevel gear 44 drives a bevel gear 48 on the upper end of a vertical drive shaft 50. The lower end of the vertical drive shaft 50 has thereon a driving gear 52. A reversible transmission selectively clutches a pair of driven gears 54 to the propeller shaft 40 to transmit forward or reverse motion to the propeller shaft 40 from the driving gear 52.

In order to seal the horizontal driveshaft 42 from water, the marine propulsion device 10 further comprises a flexible bellows, duct or conduit 60 surrounding the horizontal driveshaft 42 and extending between the gimbal housing 18 and the pivot housing 30. The gimbal housing 18 includes an opening 62 formed by a projecting portion 63 of the gimbal housing 18, and the forward end of the bellows 60 is complementary with and communicates with the opening 62 in the gimbal housing 18. The forward end of the bellows 60 is secured to the projecting portion 63 of the gimbal housing 18 by a conventional band clamp 64.

The pivot housing 30 includes an opening 66, and the rearward end of the bellows 60 is complementary with and communicates with the opening 66 in the pivot housing 30. The marine propulsion device 10 further comprises means for securing the rearward end of the bellows 60 in communication with the opening 66 in the pivot housing 30 such that the bellows 60 sealingly engages the pivot housing 30 when the propulsion unit 34 is connected to the pivot housing 30, and such that the bellows 60 is releasable from communication with the opening 66 in the pivot housing 30 when the propulsion unit 34 is disconnected from the pivot housing 30. In the preferred embodiment, the means for securing the bellows 60 is accessible from the rearward end of the pivot housing 30, i.e., when the propulsion unit 34 is removed from the pivot housing 30.

In the preferred embodiment, the pivot housing 30 includes a lip 68 extending rearwardly and radially inwardly around the opening 66, and the rearward end of the bellows 60 extends inside the opening 66 and includes a flange 70 engaged with the lip 68, the flange 70 extending forwardly and radially outwardly around the end of the bellows 60.

In the preferred embodiment, the means for securing the bellows 60 includes interengaging means on the bellows 60, on the pivot housing 30, and on the propulsion unit 34, the interengaging means including cooperating surfaces on the bellows 60 and the pivot housing 30, cooperating surfaces on the bellows 60 and the propulsion unit 34, and cooperating surfaces on the pivot housing 30 and the propulsion unit 34. Preferably, the cooperating surfaces on the bellows 60 and the pivot housing 30 are formed by interengaging means on the pivot housing 30 and on the bellows 60 for releasably securing the end of the bellows 60 in communication with the opening 66, the interengaging means including the lip 68 and the flange 70.

In the preferred embodiment, the cooperating surfaces on the bellows 60 and the propulsion unit 34 are formed by interengaging means on the propulsion unit 34 and on the end of the bellows 60 for releasably securing the end of the bellows 60 in communication with the opening 66. This interengaging means preferably includes means on the propulsion unit 34 engageable with the bellows 60 for compressing and securing the bellows 60 against the lip 68 so that the bellows 60 sealingly engages the pivot housing 30 when the propulsion unit 34 is connected to the pivot housing 30. In the preferred embodiment, the end of the bellows 60 forms a rearwardly facing groove 72, and the means engageable with the end of the bellows 60 includes a portion of the propulsion unit 34 having a forward edge 74 receivable in the groove 72 in response to connection of the propulsion unit 34 to the pivot housing 30. Preferably, this portion of the propulsion unit 34 is a bearing carrier 76.

The cooperating surfaces on the pivot housing 30 and the propulsion unit 34 converge inwardly to form a channel extending around the opening 66 and interlocking with the flange 70 on the end of the bellows 60. One of the cooperating surfaces is formed by the lip 68 on the pivot housing 30, and the other of the cooperating surfaces is formed by the bearing carrier 76 on the propulsion unit 34. The flange 70 is compressed between the cooperating surfaces (the lip 68 and the bearing carrier 76) so that the flange 70 sealingly engages the pivot housing 30. Furthermore, the channel interlocks with the flange 70 so as to substantially prevent both longitudinal and radial movement of the rearward end of the bellows 60.

Figure 2:
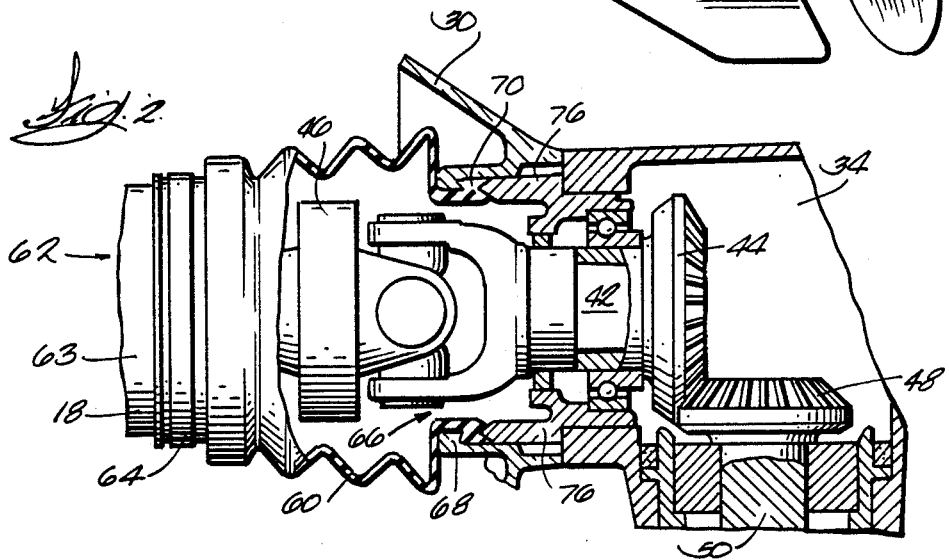
FIG. 2 is an enlarged, partial cross sectional view of the marine propulsion device.
Figure 3:
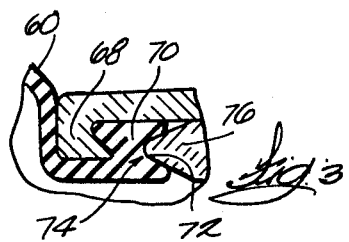
FIG. 3 is an enlarged, partial cross sectional view of the end of the bellows secured in the pivot housing.

The marine propulsion device 10 is assembled as follows. The forward end of the bellows 60 is secured to the gimbal housing 18 before the pivot housing 30 is connected to the gimbal housing 18 via the gimbal ring 20. Once the gimbal ring 20 and pivot housing 30 are connected to the gimbal housing 18, the rearward end of the bellows 60 is moved into communication with the opening 66 in the pivot housing 30 such that the flange 70 on the end of the bellows 60 engages the lip 68 on the pivot housing 30. The interengagement of the flange 70 and the lip 68 substantially prevents movement of the rearward end of the bellows 60 relative to the pivot housing 30. Finally, the propulsion unit 34 is connected to the pivot housing 30. The bearing carrier 76 pilots the propulsion unit 34 into position relative to the pivot housing 30. When the propulsion unit 34 is in position, the bearing carrier 76 extends into the pivot housing 30 and the forward edge 74 of the bearing carrier 76 is received in the groove 72 in the end of the bellows 60. The outer surface of the bearing carrier 76 abuts the inner surface of the pivot housing 30, as shown in FIG. 2. Tightening of the bolts 36 presses the bearing carrier 76 into the groove 72 and compresses and secures the bellows 60 against the lip 68 so that the bellows 60 sealingly engages the pivot housing 30. Also, the lip 68 on the pivot housing 30 and the forward edge 74 of the bearing carrier 76 interlock with the flange 70 so as to substantially prevent both longitudinal and radial movement of the rearward end of the bellows 60.

When the propulsion unit 34 is disconnected from the pivot housing 30, the bellows 60 is releasable from communication with the opening 66 in the pivot housing 30. That is, once the propulsion unit 34 is disconnected from the pivot housing 30, the rearward end of the bellows 60 can be manually disconnected from the pivot housing 30, due to the resiliency of the bellows 60. The pivot housing 30 can then be disconnected from the gimbal ring 20 or from the gimbal housing 18.

Figure 5:
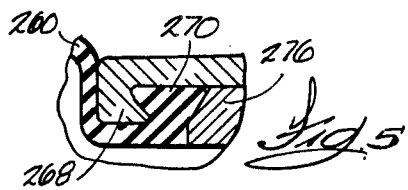
FIGS. 4 through 6 are enlarged, partial cross sectional views of the end of the bellows in alternative embodiments of the invention.
Figure 4:
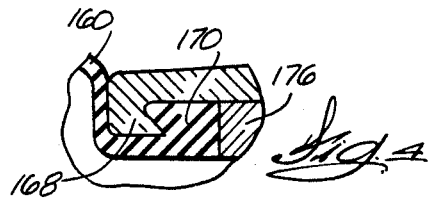
Figure 6:
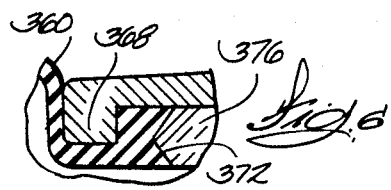

Illustrated in FIGS. 4 through 6 are three alternative embodiments of the invention. More particularly, FIGS. 4 through 6 illustrate alternative constructions of the lip on the pivot housing 30, the end of the bellows 60, and the bearing carrier 76. In all of these alternative constructions, the pivot housing and the propulsion unit include cooperating surfaces forming a channel extending around the opening in the pivot housing and interlocking with the flange on the end of the bellows. One of the cooperating surfaces is formed by the lip on the pivot housing, and the other of the cooperating surfaces is formed by the bearing carrier on the propulsion unit. However, in the alternative constructions shown in FIGS. 4 and 5, the end of the bellows does not form a rearwardly facing groove as in the preferred embodiment. Nonetheless, in these alternative embodiments, the flange is compressed between the lip and the bearing carrier so that the flange sealingly engages the pivot housing. Also, the channel interlocks with the flange so as to substantially prevent both longitudinal and radial movement of the rearward end of the bellows.

In the alternative embodiment illustrated in FIG. 4, the lip 168 extends rearwardly and radially inwardly, and the flange 170 engages the lip 168, the flange 170 extending forwardly and radially outwardly around the end of the bellows 160. However, the rearward end of the bellows is generally flat, as is the forward edge of the bearing carrier 176.

In the alternative embodiment illustrated in FIG. 5, the lip 268 extends rearwardly and radially inwardly, and the rearward end of the bellows 260 includes a flange 270 engaged with the lip 268, the flange 270 extending forwardly and radially outwardly around the end of the bellows 260. The rearward end of the bellows 260 extends rearwardly and radially outwardly, and the forward end of the bearing carrier 276 is tapered so as to be complementary with the rearward end of the bellows 260.

In the alternative embodiment illustrated in FIG. 6, the lip 368 extends radially inwardly, but not rearwardly. The rearward end of the bellows 360 includes a flange 370 engaged with the lip 368, the flange 370 extending radially outwardly but not forwardly around the end of the bellows 360. The rearward end of the bellows 360 forms a rearwardly facing groove 372 similar to the groove 72 of the preferred embodiment. The forward end of the bearing carrier 376 is complementary with and is received in the groove 372.

Various other features of the invention are set forth in the following claims.

What is claimed is:

1. A marine propulsion device comprising a flexible bellows having a rearward end, a pivot housing including an opening complementary with and communicating with said rearward end of said bellows, a propulsion unit removably connected to said pivot housing, and interengaging means on said end of said bellows and on said propulsion unit for releasably securing said end of said bellows in communication with said opening, said interengaging means including, on said end of said bellows, a rearwardly facing groove, and, in said propulsion unit, a portion having a forward edge receivable in said groove.

2. A marine propulsion device as set forth in claim 1 and further comprising cooperating surfaces on said pivot housing and said propulsion unit, wherein said end of said bellows has a flange extending radially outwardly therefrom, and wherein said cooperating surfaces on said pivot housing and said propulsion unit form a channel extending around said opening in said pivot housing and interlocking with said flange.

3. A marine propulsion device as set forth in claim 2 wherein said flange is compressed between said cooperating surfaces so that said flange sealingly engages said pivot housing.

4. A marine propulsion device as set forth in claim 2, wherein said channel interlocks with said flange so as to substantially prevent both longitudinal and radial movement of said rearward end of said bellows.

5. A marine propulsion device as set forth in claim 2 wherein said pivot housing includes a lip extending inwardly around said opening and forming one of said cooperating surfaces, and wherein said propulsion unit includes a portion adjacent to said lip and forming the other of said cooperating surfaces.

6. A marine propulsion device as set forth in claim 1 wherein said portion of said propulsion unit is a bearing carrier.

7. A marine propulsion device as set forth in claim 1 wherein said end of said bellows has a flange extending radially outwardly therefrom, and wherein said pivot housing includes a lip extending inwardly around said opening and being interengaged with said flange.

8. A marine propulsion device comprising a pivot housing adapted to be mounted on the transom of a boat for pivotal movement relative to the transom about a generally vertical steering axis, and about a generally horizontal tilt axis, said pivot housing including an opening, a propulsion unit removably connected to said pivot housing, a flexible bellows having an end complementary with said opening in said pivot housing, and means for securing said end of said bellows in communication with said opening such that said bellows sealingly engages said pivot housing when said propulsion unit is connected to said pivot housing, and for permitting, without other action, manipulation and removal of said bellows from communication with said opening in said pivot housing when said propulsion unit is disconnected from said pivot housing.

9. A marine propulsion device as set forth in claim 8 wherein said pivot housing has a rearward end, wherein said propulsion unit is removably connected to said rearward end of said pivot housing, and wherein said means for securing said bellows is accessible from said rearward end of said pivot housing.

10. A marine propulsion device as set forth in claim 8 wherein said securing means includes interengaging means on said pivot housing and on said bellows.

11. A marine propulsion device as set forth in claim 10 wherein said pivot housing includes a lip extending inwardly around said opening, wherein said end of said bellows includes a flange engaged with said lip, and wherein said interengaging means includes said flange and said lip.

12. A marine propulsion device as set forth in claim 11 wherein said lip extends rearwardly and radially inwardly around said opening, and wherein said flange extends forwardly and radially outwardly around said end of said bellows.

13. A marine propulsion device as set forth in claim 12 wherein said interengaging means also includes, on said propulsion unit, means engageable with said end of said bellows for compressing and securing said bellows against said lip so that said bellows sealingly engages said pivot housing when said propulsion unit is connected to said pivot housing.

14. A marine propulsion device as set forth in claim 13 wherein said end of said bellows forms a rearwardly facing groove, and wherein said means engageable with said end of said bellows includes a portion of said propulsion unit having a forward edge receivable in said groove in response to connection of said propulsion unit to said pivot housing.

15. A marine propulsion device as set forth in claim 14 wherein said portion of said propulsion unit is a bearing carrier.

16. A marine propulsion device as set forth in claim 8 wherein said bellows has a rearward end with a flange extending radially outwardly therefrom, wherein said pivot housing and said propulsion unit include cooperating surfaces forming a channel extending around said opening and interlocking with said flange, and wherein said securing means includes said flange and said cooperating surfaces.

17. A marine propulsion device as set forth in claim 16 wherein said flange is compressed between said cooperating surfaces so that said flange sealingly engages said pivot housing.

18. A marine propulsion device as set forth in claim 16 wherein said channel interlocks with said flange so as to substantially prevent both longitudinal and radial movement of said rearward end of said bellows.

19. A marine propulsion device as set forth in claim 16 wherein said pivot housing includes a lip extending inwardly around said opening and forming one of said cooperating surfaces, and wherein said propulsion unit includes a portion adjacent to said lip and forming the other of said cooperating surfaces.

20. A marine propulsion device as set forth in claim 19 wherein said portion of said propulsion unit is a bearing carrier having a forward edge forming said other of said cooperating surfaces.

21. A marine propulsion device as set forth in claim 8 wherein said securing means includes interengaging means on said propulsion unit and on said end of said bellows.

22. A marine propulsion device as set forth in claim 21 wherein said interengaging means includes, on said end of said bellows, a rearwardly facing groove, and, in said propulsion unit, a portion having a forward edge receivable in said groove.

23. A marine propulsion device as set forth in claim 22 wherein said portion of said propulsion unit is a bearing carrier.

24. A marine propulsion device comprising a pivot housing adapted to be mounted on the transom of a boat for pivotal movement relative to the transom about a generally vertical steering axis, and about a generally horizontal tilt axis, said pivot housing including an opening, and a lip extending rearwardly and radially inwardly around said opening, a propulsion unit removably connected to said pivot housing for pivotal movement with said pivot housing, a flexible bellows having an end including a forwardly and radially outwardly extending flange engaged with said lip, and interengaging means on said pivot housing and on said end of said bellows for releasably securing said end of said bellows in communication with said opening, said interengaging means including said lip and said flange.

25. A marine propulsion device as set forth in claim 24 wherein said propulsion unit includes means engageable with said end of said bellows for compressing and securing said bellows against said lip so that said bellows sealingly engages said pivot housing when said propulsion unit is connected to said pivot housing.

26. A marine propulsion device as set forth in claim 25 wherein said end of said bellows forms a rearwardly facing groove, and wherein said means engageable with said end of said bellows includes a portion of said propulsion unit having a forward edge receivable in said groove in response to connection of said propulsion unit to said pivot housing.

27. A marine propulsion device as set forth in claim 26 wherein said portion of said propulsion unit is a bearing carrier.

28. A marine propulsion device comprising a flexible bellows having a rearward end with a flange extending radially outwardly therefrom, a pivot housing including an opening complementary with and communicating with said rearward end of said bellows, and a lip extending inwardly around said opening, and a propulsion unit removably connected to said pivot housing, said propulsion unit including a rotatably mounted propeller, a drive shaft drivingly connected to said propeller, a bearing rotatably supporting said drive shaft, and a bearing carrier supporting said bearing, said bearing carrier having a forward edge located adjacent said lip, said lip and said bearing carrier including inwardly converging cooperating surfaces forming a channel extending around said opening and being adapted to interlock with said flange.

29. A marine propulsion device as set forth in claim 28 wherein said flange is adapted to be compressed between said cooperating surfaces so that said flange sealingly engages said pivot housing.

30. A marine propulsion device as set forth in claim 28 wherein said channel is adapted to interlock with said flange so as to substantially prevent both longitudinal and radial movement of said rearward end of said bellows.

31. A marine propulsion device comprising a pivot housing adapted to be mounted on the transom of a boat for pivotal movement relative thereto about a generally vertical steering axis, and about a generally horizontal tilt axis, said pivot housing including an opening, and a lip extending radially inwardly around said opening, a flexible bellows having an end complementary with and communicating with said opening in said pivot housing, said end of said bellows including a rearwardly facing grove, and a flange engaged with said lip, said flange extending radially outwardly around said end of said bellows, and a propulsion unit removably connected to said pivot housing, said propulsion unit including a rotatably mounted propeller, a drive shaft drivingly connected to said propeller, a bearing rotatably supporting said drive shaft, and a bearing carrier supporting said bearing, said bearing carrier having a forward edge received in said groove, said lip and said forward edge of said bearing carrier including inwardly converging cooperating surfaces forming a channel extending around said opening and interlocking with said flange.

* * * * *